(12) United States Patent
Kellner et al.

(10) Patent No.: US 10,618,564 B2
(45) Date of Patent: Apr. 14, 2020

(54) SILL COMPONENT FOR THE SILL OF A VEHICLE BODY

(71) Applicant: Dr. Ing. h.c. F. Porsche Aktiengesellschaft, Stuttgart (DE)

(72) Inventors: Philipp Kellner, Rennigen (DE); Jens Bohlien, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/162,588

(22) Filed: Oct. 17, 2018

(65) Prior Publication Data

US 2019/0118868 A1    Apr. 25, 2019

(30) Foreign Application Priority Data

Oct. 19, 2017    (DE) .......................... 10 2017 124 391

(51) Int. Cl.
  *B62D 25/02*  (2006.01)
  *B62D 29/00*  (2006.01)
  *B62D 27/02*  (2006.01)
  *B62D 21/15*  (2006.01)
(52) U.S. Cl.
  CPC ......... *B62D 25/025* (2013.01); *B62D 21/157* (2013.01); *B62D 27/023* (2013.01); *B62D 29/005* (2013.01); *B62D 29/008* (2013.01)
(58) Field of Classification Search
  CPC ........................... B62D 25/025; B62D 21/157
  USPC ........................................... 296/209, 187.12
  See application file for complete search history.

(56) References Cited

U.S. PATENT DOCUMENTS

| | | | | |
|---|---|---|---|---|
| 8,366,185 B2 * | 2/2013 | Herntier | ............... | B62D 25/025 296/187.12 |
| 8,720,984 B2 * | 5/2014 | Kurogi | ............... | B62D 25/02 296/205 |
| 8,960,781 B2 * | 2/2015 | Rawlinson | ............. | B62D 25/02 296/209 |
| 2003/0193217 A1 * | 10/2003 | Hesch | ..................... | B60J 5/042 296/208 |
| 2006/0043774 A1 * | 3/2006 | McNulty | ............... | B62D 25/025 296/209 |
| 2011/0285175 A1 * | 11/2011 | Imamura | ................ | B60J 5/0426 296/193.05 |

(Continued)

FOREIGN PATENT DOCUMENTS

| | | |
|---|---|---|
| DE | 10 2012 024 836 | 6/2014 |
| DE | 10 2013 004 852 | 9/2014 |

*Primary Examiner* — Dennis H Pedder
(74) *Attorney, Agent, or Firm* — Gerald E. Hespos; Michael J. Porco; Matthew T. Hespos

(57) ABSTRACT

A sill component (10) for the sill of a vehicle body (100) has an outer shell (20) made from a metal material and an inner profile (30) made from an aluminum material. The outer shell (20) is connected via a first connection section (22) to a first complementary connecting section (32) of the inner profile (30) and via at least one second connecting section (24) to at least one second complementary connecting section (34) of the inner profile (30) in a manner that transmits force along a longitudinal direction (LR) of the vehicle body (100). At least one receiving space (40) is arranged between the two connecting sections (22, 24) and a reinforcing component (50) is in the receiving space (40) for the mechanical reinforcement of the outer shell (20).

13 Claims, 3 Drawing Sheets

(56) References Cited

U.S. PATENT DOCUMENTS

2014/0294489 A1* 10/2014 Sakai .................... B62D 25/02
                                                           403/267
2015/0258956 A1*  9/2015 Sassi ................... B60R 21/0136
                                                            701/45
2016/0325786 A1* 11/2016 Elfwing ............... B62D 25/025

* cited by examiner

SILL COMPONENT FOR THE SILL OF A VEHICLE BODY

CROSS REFERENCE TO RELATED APPLICATION

This application claims priority under 35 USC 119 to German Patent Appl. No. 10 2017 124 391.7 filed on Oct. 19, 2017, the entire disclosure of which is incorporated herein by reference.

BACKGROUND

Field of the Invention

The invention relates to a sill component for the sill of a vehicle body, and to a method for producing a sill component of this type.

Related Art

A vehicle body should be designed to absorb mechanical loads during the operation of the vehicle and to ensure mechanical protection for the vehicle and the passenger compartment. The vehicle body includes sill components that are attached on the left and right sides of the vehicle in the region of the undertray. Sill components usually delimit the vehicle body on the left and right sides between the front and rear wheel arches. Known sill components usually are manufactured from a homogeneous material, for example from metal shells. The use of aluminum profiles is also generally known.

Known sill components often have disadvantages with regard to the stability in the case of a particular form of crash that is known as the side pole crash. A side pole crash causes a pole to introduce an action of force to the sill component at a local point of the sill component. Thus, the side pole crash causes a relatively pronounced deformation of the known sill component toward the interior compartment of the vehicle body. Thus, a clearance must be provided in the vehicle body on the side of the known sill component that faces into the vehicle. More particularly, the deformation of the sill component into the clearance dissipates the energy of the pole. However, this clearance is no longer made available as useful space. In the case of electrically driven vehicles, the deep installation space between the sill components ideally is provided as installation and useful space for the battery apparatus of the vehicle. The necessary clearance for the sill of the sill component reduces the maximum possible useful size or the maximum possible useful space for the associated battery apparatus.

It is an object of the invention to at least partially eliminate the above-described disadvantages. In particular, it is an object of the invention to provide an inexpensive and simple sill component that permits an increased useful width on the inner side of the vehicle body in the case of identical or improved, mechanical stability criteria.

It goes without saying that features that are described with reference to the sill component can also be capable of being combined with features of the method according to the invention, or vice versa.

SUMMARY

The invention relates to a sill component for the sill of a vehicle body. The sill component has an outer shell made from a metal material and an inner profile made from an aluminum material. The outer shell is connected via a first connecting section to a first complementary connecting section of the inner profile and via at least one second connecting section to at least one second complementary connecting section of the inner profile in a manner that transmits force along a longitudinal direction of the vehicle body. At least one receiving space is between the two connecting sections, and a reinforcing component is arranged at least in sections of the receiving space for mechanical reinforcement of the outer shell.

The outer shell made from a metal material and the inner profile made from an aluminum material represent the fundamental and load-bearing components of the sill component. To ensure a mechanical load-bearing capability for the entire system of the sill component, the outer shell is equipped with at least one first connecting section and at least one second connecting section. Each connecting section correlates with a corresponding complementary connecting section of the inner profile. The outer shell also may have a third connecting section and a fourth or further connecting sections that correspond accordingly with a third complementary connecting section or further complementary connecting sections of the inner profile.

A force-transmitting connection between the outer shell and the inner profile is provided between the respective connecting section and the associated complementary connecting section. The force-transmitting connection can be configured both in a reversible and in an irreversible way. In particular, a positively locking connection, a non-positive connection and/or an integrally joined connection is selected for the force-transmitting connection, as will be described later in greater detail. Different connecting types also can be combined for generation of the force-transmitting connection on the respective connecting section to the complementary connecting section. It is also possible that different connecting types are used on different connecting sections jointly in the one sill component.

The longitudinal direction of the vehicle body is to be understood to mean the longitudinal direction of the vehicle in the installed situation. A vehicle is usually defined by way of a longitudinal direction, a transverse direction and a vertical direction. The vertical direction is perpendicular or substantially perpendicular to a defined roadway surface. The roadway surface is spanned by the longitudinal direction and the transverse direction of the vehicle body. The longitudinal direction is directed substantially along the driving direction of the vehicle, whereas the transverse direction is oriented transverse to the driving direction or transverse to the longitudinal direction.

The sill components extend in the longitudinal direction on the two sides of the vehicle body. Thus, the connecting sections and the complementary connecting sections also are oriented along the longitudinal direction. The connecting sections may be substantially parallel to the longitudinal direction of the vehicle body.

A connection is provided in a first step via the connecting sections and the complementary connecting sections for transmitting force between the outer shell and the inner profile. The reinforcing component is provided as a third component to improve transmission of force in a side pole impact and is disposed in a receiving space between the two connecting sections. The receiving space can be provided both by way of a corresponding receiving volume of the outer shell and by way of a corresponding receiving volume of the inner profile. Combinations of corresponding protuberances of the outer shell and/or of the inner profile also can be provided for configuring the receiving space.

The reinforcing component may be connected mechanically or in a force-transmitting manner to the outer shell to reinforce the outer shell mechanically. Additionally, or alternatively, the reinforcing component may be connected in a force-transmitting way to the inner profile. In one embodiment, the reinforcing component ensures an exclusive or substantially exclusive direct mechanical reinforcement of the outer shell in a force-transmitting manner, whereas a connection to the inner profile is of force-free or substantially force-free configuration.

The arrangement of the reinforcing component in the receiving space achieves several advantages. One decisive advantage is in the above-described side pole crash. A pole crash causes a force to be exerted by the pole centrally and locally at a specific point on the outer shell. This action of force is absorbed by the mechanical reinforcement provided by the reinforcing component and can be forwarded in a stabilized manner via the outer shell. The stabilized absorbed force of the pole can be dissipated and forwarded via the respective connecting section and via the reinforcing component to the associated complementary connecting section. In other words, the reinforcing component helps to cushion the force that is absorbed by the outer shell, and dissipates the force up and/or down into the connecting sections and the complementary connecting sections. The force also can be absorbed by the inner profile by virtue of the fact that the complementary connecting sections are part of the inner profile. Thus, the reinforcing component helps support the outer shell against the inner profile and stabilizes the cross section of the outer shell.

The invention ensures that forces caused by a side pole crash will not result solely in a local deformation of the outer shell. Rather, the force that can be distributed widely and can be apportioned by the mechanically stabilizing and reinforcing effect of the reinforcing component to a considerably greater area and/or a considerably greater volume of the entire sill component and the inner profile. The associated plastic deformation also is apportioned to a greater volume of the sill component than in prior art arrangements. A considerably greater proportion of the sill component then is deformed plastically as viewed in the longitudinal direction. Thus, the plastic deformation transversely with respect to the longitudinal direction, that is to say in the inwardly directed transverse direction of the vehicle body, can be considerably lower than was the case in the prior art.

In accordance with the invention, the necessary clearance in the transverse direction within the sill component can be smaller magnitude to provide the necessary deformation for the volume size even in the case of a pole crash. In other words, an identical or improved mechanical stability of the sill component is obtained while achieving a greater useful space by way of a smaller deformation space in the interior of the vehicle body.

These advantages can be achieved with a particularly light design by way of the hybrid configuration with a metal material for the outer shell, aluminum material for the inner profile and with a plastic material for the reinforcing component.

The reinforcing component may be connected to the outer shell in a manner that transmits force by at least one of a positively locking connection, a non-positive connection and an integrally joined connection. These or other connecting types can be combined with one another on the same connecting section. The combination of different connecting types and different connecting sections of the sill component also is conceivable. A positively locking connection can be, for example, an engagement of complementary surfaces into one another. A non-positive connection can also be achieved with the aid of mechanical interlocking. If adhesion promoters or adhesives or even welding methods are used, an integrally joined connecting type can also be used for the force-transmitting connection.

It is likewise advantageous if, in the case of a sill component according to the invention, the reinforcing component is configured separately from the outer shell and from the inner profile, in particular from a plastic material. The plastic material can be a thermoplastic and/or a thermoset plastic material, such as polyamides or PPAs. Thermosetting epoxy resins or polyurethane foams are also conceivable as a plastic material for the reinforcing component. The manufacture of the reinforcing component can take place both directly within the outer shell during assembly, and already in advance, for example using an injection molding method. Foaming of the outer shell with a corresponding foam-like reinforcing component of hardened configuration is also conceivable within the context of the invention.

The reinforcing component may have at least one reinforcing rib for a mechanical reinforcement of the reinforcing component. A reinforcing rib of this type serves as a mechanical stabilization to ensure the desired force dissipation to the connecting sections and the corresponding complementary connecting sections and directly to the inner profile in as inexpensive a manner as possible and with a low weight. The reinforcing ribs can be provided by way of an extrusion method. Impact extrusion, injection molding or pultrusion methods are also conceivable within the context of the invention as manufacturing methods for a reinforcing component of this type. Two or more corresponding reinforcing ribs can also be used.

The receiving space can be configured at least partially by way of a protuberance of the outer shell, in particular a protuberance of hat-shaped cross section. In this way, the complexity of the manufacture for the receiving space is reduced considerably. The inner profile also can have a corresponding protuberance. If, however, the protuberance is limited to the outer shell, a profile cross section with straight or substantially straight side walls can be provided for the inner profile. This leads to a further reduction of the complexity of the manufacture. The outer shell or the corresponding hat-shaped protuberance can be provided, for example, by way of pressing and/or deep drawing, both in a cold or warm state.

The reinforcing component may have two or more receiving spaces in the longitudinal direction and/or transversely with respect to the longitudinal direction. The two or more receiving spaces may be separated from one another by webs or ribs. Plural sections may adjoin one another along the longitudinal direction to equip the sill component at a plurality of sections with the quality according to the invention. In particular, the two corresponding sections may correlate to associated sections of the vehicle, for example the A-pillar, B-pillar, C-pillar or corresponding access doors to the vehicle. The additional webs or ribs between the receiving spaces may serve as an additional reinforcement of the sill component. They can be designed for a high energy absorption with a smallest possible residual block after the deformation. In particular, the webs or ribs have smaller wall thicknesses than the outer walls of the outer profile. Moreover, the webs or ribs can have oblique angles or even curvatures with respect to the longitudinal direction.

At least section of the reinforcing component may be a fiber composite component. Therefore, the mechanical reinforcement can be provided in a desired way in a particularly light and inexpensive manner. The reinforcement can be classic glass fibers, carbon fibers, natural fibers, basalt fibers and/or aramid fibers for example. The combination of different fiber materials is also conceivable for the reinforcing component. Short fibers, long fibers and endless fibers can be used alone or in any desired combination. A pressed mass or what is known as an organosheet can be used for the reinforcing component.

The inner profile may be configured as an endless profile and may have at least two profile chambers that extend along the longitudinal direction. In this way, the endless profile can be manufactured in a particularly simple and inexpensive manner, for example by way of continuous casting manufacturing. Moreover, an improved stability and a defined plastic deformation behavior in a crash situation are ensured. The desired distribution and propagation of the forces in the longitudinal direction is assisted by the individual profile chambers.

The connecting sections and the complementary connecting sections may be of complementary or substantially complementary configuration with respect to one another. These complementary configurations may be planar or substantially planar surfaces. The complementary configuration entails an easier configuration of the necessary force-transmitting connections. In particular, in the case of the configuration of non-positive and/or positively locking connections, a complementary configuration can entail a great simplification and therefore advantages.

The invention also relates to a method for producing a sill component in accordance with the present invention. A method of this type has the following steps:

arranging a reinforcing component in a receiving space of an outer shell for the mechanical reinforcement of the outer shell, configuring a force-transmitting connection between the outer shell and the inner profile via the first and the second connecting sections and the first and second complementary connecting sections.

The manufacturing method of the invention entails the same advantages as described in detail in relation to a sill component according to the invention.

The invention will be described in detail using the appended figures.

DETAILED DESCRIPTION

Figure 1:
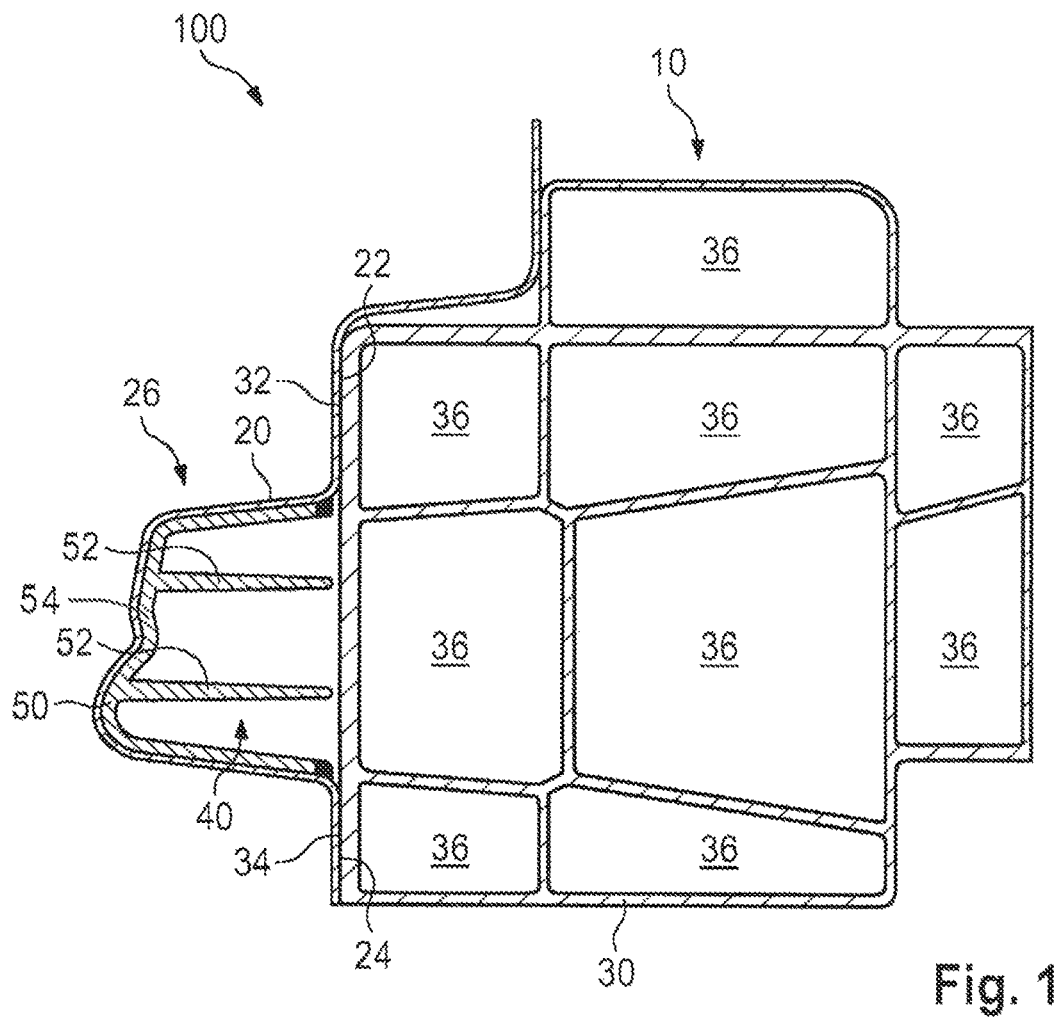
FIG. 1 is a cross-section of a sill component according to an embodiment of the invention.

FIG. 1 diagrammatically shows a cross section through a sill component 10 of a vehicle body 100 according to one embodiment of the invention. The longitudinal direction LR is perpendicular to the plane of the drawing of FIG. 1.

As can be seen clearly in FIG. 1, the sill component 10 is equipped with three fundamental components, namely, an outer shell 20, an inner profile 30, and a reinforcing component 50. The outer shell 20 is a metal plate and closes the sill component 10 toward the outside. A pole crash exerts an action of force on the outer shell 20 locally and a deformation of the outer shell 20 will follow. The introduced force is supported in the outer shell 20 by way of the reinforcing component 50 that is situated here in a protuberance 26 in a receiving space 40. More particularly, the protuberance 26 forms a convex outer surface and a concave inner surface facing toward the receiving space 40 and toward the inner profile 30. A reinforcing component 50 with two reinforcing ribs 52 is arranged for mechanical stabilization. The reinforcing component 50 has a base 54 that nests in the concave inner surface formed by the protuberance 26. The reinforcing ribs 52 project from a concave inner surface of the base 54 of the reinforcing component 50 toward the inner profile 30.

A dissipation of the introduced central crash force to an upper first connecting section 22 and a lower second connecting section 24 and directly to the inner profile can take place as a result of the above-described reinforcement with the aid of the reinforcing component 50. A connection to an associated complementary connecting section 32 and 34 is provided in each case in a force-transmitting way. It is therefore possible to transfer the introduced and upward and downward dissipated force to the inner profile 30, which comprises an aluminum material and has a plural profile chambers 36. In the case of a centrally introduced pole crash, the deformation will be distributed as a result of the widening at the top and the bottom to a wide extent in the inner profile 30 along the longitudinal direction LR, that is into the plane of the drawing and out of the plane of the drawing. The corresponding deformation in FIG. 1 to the right and into the interior space is reduced so that a reduced deformation space leads to a larger useful space within the vehicle body 100.

Figure 2:
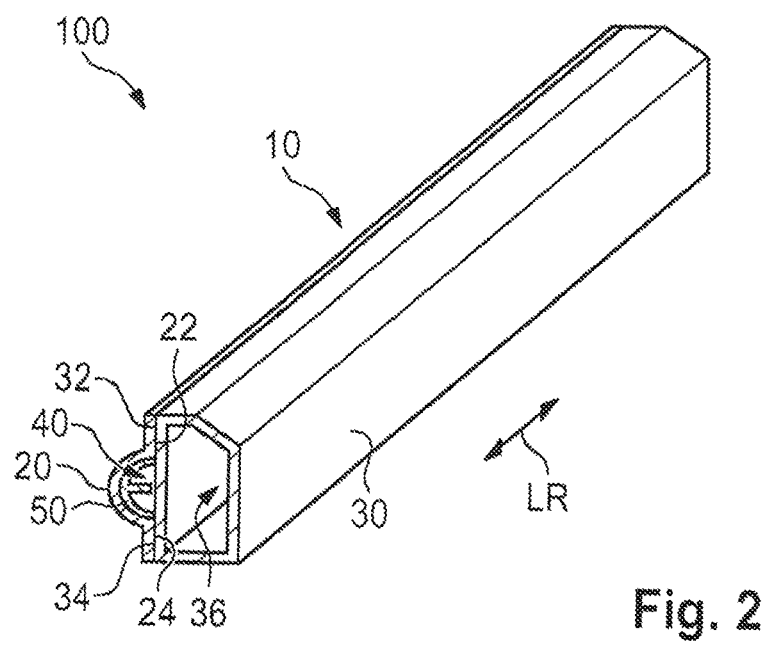
FIG. 2 is a perspective view of a further embodiment of a sill component according to the invention.

FIG. 2 shows that the inner profile 30 can also be constructed from a single profile chamber 36. The combination for the sill component 10 with an outer shell 20 and a corresponding reinforcing component 50 in the receiving space 40 also is shown. The longitudinal direction LR is shown clearly in the perspective illustration.

Figure 3:
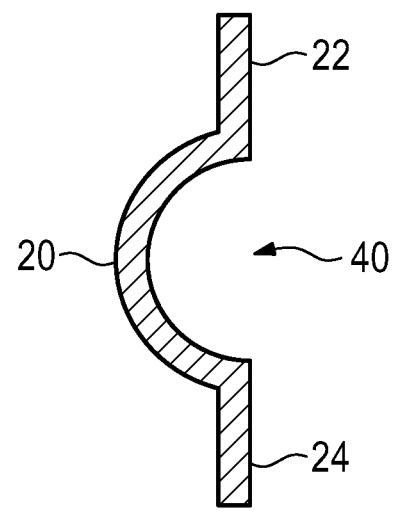
FIG. 3 shows a first step of a method according to the invention.
Figure 4:
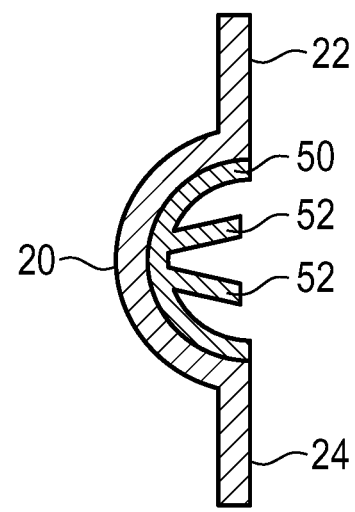
FIG. 4 shows a further step of a method according to the invention.
Figure 5:
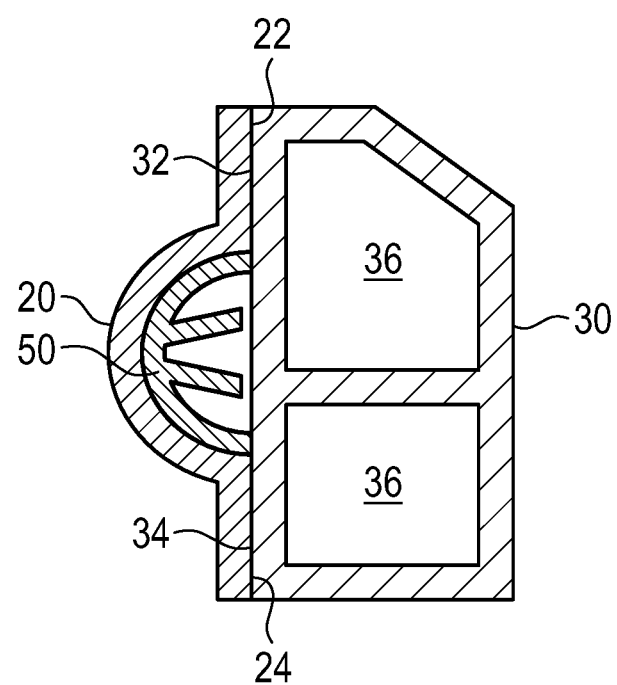
FIG. 5 shows the last step of a method according to the invention.

A method according to the invention is described in an abstract manner using FIGS. 3 to 5. In the first step, an outer shell 20 with a protuberance 26 and an associated receiving space 40 is provided. In accordance with FIG. 4, in the following step, the reinforcing component 50 is inserted or, for example, is produced directly there by way of pressing in or pressing on or direct molding using the injection molding method. In this case, two reinforcing ribs 52 are provided on the reinforcing component 50. Finally, it is then possible to establish the force-transmitting connection of the inner profile 30 to the connecting sections 22 and 24 via the complementary connecting sections 32 and 34. FIG. 5 then shows finally how a further embodiment of a sill component 10 can be equipped. The inner profile 30 is also equipped with two separate profile chambers 36.

The preceding explanations of the embodiments describes the invention exclusively within the context of examples. It goes without saying that individual features of the embodiments can be combined freely with one another, in so far as this is technically appropriate, without departing from the scope of the invention.

What is claimed is:

1. A sill component for the sill of a vehicle body, having an outer shell made from a metal material and an inner profile made from an aluminum material, the outer shell being connected via a first connecting section to a first complementary connecting section of the inner profile and via a second connecting section to a second complementary connecting section of the inner profile in a manner that transmits force along a longitudinal direction of the vehicle body, the outer shell being configured relative to the inner profile to define a receiving space between the outer shell and the inner profile, with the receiving space being bounded by locations where the first and second connecting sections are connected respectively to the first and second complementary connecting sections, and a reinforcing component arranged in the receiving space, the reinforcing component having a base nested against areas of the outer shell facing toward the inner profile and further having at least one reinforcing rib projecting from the base toward the inner profile for the mechanical reinforcement of the outer shell.

2. The sill component of claim 1, wherein the reinforcing component is connected to the outer shell in a force-transmitting connection that comprises at least one of the following connecting types:
 positively locking
 non-positive
 integrally joined.

3. The sill component of claim 1, wherein the reinforcing component is configured separately from the outer shell and from the inner profile, and is formed from a plastic material.

4. The sill component of claim 3, wherein the at least one reinforcing rip comprises plural reinforcing ribs.

5. The sill component of claim 1, wherein the outer shell and the reinforcing component are connected to one another and are configured as a metal/plastic hybrid component.

6. The sill component of claim 1, wherein the reinforcing component is configured at least in sections as a fiber composite component.

7. The sill component of claim 1, wherein the inner profile is an endless profile with at least two profile chambers that extend along the longitudinal direction.

8. The sill component of claim 4, wherein the reinforcing ribs are spaced from one another.

9. The sill component of claim 8, wherein the reinforcing ribs extend across areas of the receiving space between the base of the reinforcing component and the inner profile.

10. The sill component of claim 9, wherein the reinforcing ribs diverge from one another while extending from the base of the reinforcing component toward the inner profile.

11. The sill component of claim 9, wherein the reinforcing ribs are substantially parallel.

12. The sill component of claim 1, wherein the first and second complementary connecting of the inner profile define outermost surfaces on the inner profile.

13. The sill component of claim 1, wherein the reinforcing component is spaced from the inner profile.

* * * * *